United States Patent
Mullally

(10) Patent No.: US 6,945,815 B1
(45) Date of Patent: Sep. 20, 2005

(54) QUICK CONNECT ELECTRICAL OUTLET

(76) Inventor: James Paul Mullally, 11537 34th Ave. Northeast, Seattle, WA (US) 98125

( * ) Notice: Subject to any disclaimer, the term of this patent is extended or adjusted under 35 U.S.C. 154(b) by 0 days.

(21) Appl. No.: 10/889,593

(22) Filed: Jul. 12, 2004

(51) Int. Cl.$^7$ ............................................. H01R 13/60
(52) U.S. Cl. ...................................... 439/535; 439/180
(58) Field of Search .................. 439/535, 180, 439/650; 174/53, 57, 66

(56) References Cited

U.S. PATENT DOCUMENTS

| | | | |
|---|---|---|---|
| 3,510,822 A | | 5/1970 | Patterson |
| 3,651,446 A | | 3/1972 | Sadogierski et al. |
| 3,716,651 A | | 2/1973 | Werner |
| 4,046,449 A | | 9/1977 | Ranzanigo |
| 4,875,880 A | | 10/1989 | Welch et al. |
| 5,180,886 A | | 1/1993 | Dierenbach et al. |
| 5,562,341 A | * | 10/1996 | Strauss ....................... 439/535 |
| 5,735,710 A | | 4/1998 | Blaauboer et al. |
| 6,259,023 B1 | | 7/2001 | Reiker |
| 6,309,248 B1 | * | 10/2001 | King .......................... 439/535 |
| 6,361,333 B1 | | 3/2002 | Cash, Jr. |
| 6,617,511 B2 | * | 9/2003 | Schultz et al. ................ 174/53 |
| 6,648,488 B1 | * | 11/2003 | Pearce ......................... 362/96 |
| 6,799,982 B2 | * | 10/2004 | Kerr, Jr. ...................... 439/180 |

FOREIGN PATENT DOCUMENTS

| | | |
|---|---|---|
| GB | 2.312.340 | 10/1997 |
| WO | WO96/05633 | 2/1996 |

* cited by examiner

*Primary Examiner*—Briggitte R. Hammond
(74) *Attorney, Agent, or Firm*—Michael I Kroll

(57) ABSTRACT

A method and apparatus for wiring installations that is comprised of designating locations for outlet boxes 12 and wiring to an incorporated terminal block that has connection means for installing either receptacles or switches 36 at a later time by anyone without the need of electrical expertise. The receptacles 12 and switches 36 have corresponding mating connection means 16, 18 related to the previously wired outlet box termination blocks. The simplified wiring method allows for the replacement of switches 36 and receptacles 12 with any other style of switch or receptacle having the mating connection members 16, 18.

4 Claims, 14 Drawing Sheets

QUICK CONNECT ELECTRICAL OUTLET

BACKGROUND OF THE INVENTION

1. Field of the Invention

The present invention relates generally to electrical connectors and, more specifically, to a method and apparatus for wiring installations that will speed up the wiring process and provide a functionality that is not currently available. The method is comprised of designating locations for outlet boxes and wiring to an incorporated terminal block that has connection means for installing either receptacles or switches at a latter time by anyone without the need of electrical expertise. The receptacles and switches have corresponding mating connection means related to the previously wired outlet box termination blocks. The simplified wiring method allows for the replacement of switches and receptacles to any other style of switch or receptacle having the mating connection members.

2. Description of the Prior Art

There are other outlet boxes designed for receptacles and switches. Typical of these is U.S. Pat. No. 3,510,822 issued to Patterson on May 5, 1970.

Another patent was issued to Sadogierski, et al. on Mar. 21, 1972 as U.S. Pat. No. 3,651,446. Yet another U.S. Pat. No. 3,716,651 was issued to Werner on Feb. 13, 1973 and still yet another was issued on Sep. 6, 1977 to Ranzanigo as U.S. Pat. No. 4,046,449.

Another patent was issued to Welch, et al. on Oct. 24, 1989 as U.S. Pat. No. 4,875,880. Yet another U.S. Pat. No. 5,180,886 was issued to Dierenbach, et al. on Jan. 19, 1993. Another was issued to Blaauboer, et al. on Apr. 7, 1998 as U.S. Pat. No. 5,735,710 and still yet another was issued on Jul. 10, 2001 to Reiker as U.S. Pat. No. 6,259,023.

Another patent was issued to Cash, Jr. on Mar. 26, 2002 as U.S. Pat. No. 6,361,333. Yet another W.I.P.O Patent No. WO 96/05633 was issued to Jones on Feb. 22, 1996. Another was issued to Polycarpou on Oct. 22, 1997 as U.K. Patent No. GB2312340.

U.S. Pat. No. 3,510,822

Inventor: Edmund M. Patterson

Issued: May 5, 1970

Connector assembly for connecting electrical cables, each having three wires arranged in laterally spaced relation, comprising means forming a first set of guide channels in said connector assembly extending from one outer surface thereof toward separate junction points, there being one guide channel for each wire in one of said cables, means forming a second set of guide channels in said connector assembly extending from another outer surface thereof towards said junction points, there being one guide channel for each wire of another of said cables one of said channels in each set extending centrally of said connector assembly and the remaining channels of each set diverging outwardly toward the edges of said connector assembly, and said guide channels being constructed and arranged to dispose the portions of the wires inserted therethrough in overlapping relations at said junction points, and means accessible from the exterior of said assembly for connecting said wires at said junction points.

U.S. Pat. No. 3,651,446

Inventor: Walter C. Sadoglerski

Issued: Mar. 21, 1972

An adapter for mounting an electric socket or the like in a panel board. The adapter is shaped to receive and hold the socket. Spaced lugs extend outwardly from opposite sides of the adapter and engage the rear side of the panel. First and second flanges also extend outwardly from the adapter adjacent the lugs for holding the appliance against the front side of the panel. The flanges are fastened to the adapter by resilient, outwardly biased segments that hold the flanges in engagement with the front side of the panel. The biased segments may be releasably moved toward the adapter to install or remove the adapter from the panel board thereby allowing the socket to be wired prior to the time it is mounted in the panel board.

U.S. Pat. No. 3.716,651

Inventor: Ardwin Werner

Issued: Feb. 13, 1973

A plug receiving and switch adaptable device. This device is primarily for the purpose of eliminating the excess wire normally required to make electrical connections to switches, receptacles and the like, and includes a rectangular base with spring clip means received within openings of the outer box shell which receives the plug receptacle or other unit.

U.S. Pat. No. 4,046,449

Inventor: Pierluigi Ranzanigo

Issued: Sep. 6, 1977

A system for interchangeable attachment of electrical equipment carried on an insulating frame to a mounting plate. Electrical equipment carried on an insulating frame can be quickly and easily attached to a mounted plate by a simple snapping action of detents located on the mounting plate into associated cut outs located on an insulating frame. Once attached to the mounting plate, the equipment and the associated insulating frame can only be removed by depressing a resilient plate in which these detents are located with a screwdriver or similar tool.

U.S. Pat. No. 4,875,880

Inventor: Glenn S. Welch

Issued: Oct. 24, 1989

A modular faceplate system having four levels of modularity includes a standard faceplate, a plurality of secondary support members, and a plurality of modules. The faceplate may be secured to a variety of support structures such as an outlet box, a modular box and a wall box. The faceplate has an elongated opening formed therein for the secondary support members. The secondary support members support the various different modules in various configurations. The modules can support a variety of electrical devices including plugs and electrical connectors. The faceplate, secondary support members and modules all include snap-type fastening means such that a desired faceplate configuration can be assembled from the component parts without the use of hardware.

U.S. Pat. No. 5,180,886

Inventor: Karl Dierenbach, et al.

Issued: Jan. 19, 1993

A facade assembly for an electric socket consists of a support for mounting to the socket, a cover plate to provide a raised decorative area that covers the socket, and a wallplate to surround the raised area and snap onto the cover plate. The facade assembly provides an attractive "designer-style" appearance that permits easy replacement of modular elements that determine the aesthetic qualities of the assembly.

U.S. Pat. No. 5,735,710

Inventor: Wayne A. Blaauboer

Issued: Apr. 7, 1998

A system for connecting modular electrical components, like switches and wall outlets, into electrical wall boxes. There are electrical connections on the side of each electrical component to form a series of side-by-side electrical components that are to be placed into the electrical box without having to use multiple short wires between the components. There is a common power, neutral, and ground bus plane running through each electrical component which eliminates the need to manually connect each electrical component in a daisy chain. The electrical box is accessible from the rear for wiring the modular electrical components. The electrical box also has two separate cavities, one for placing the modular electrical components into, and the other for housing and attaching the electrical wiring leading to and from the electrical box.

U.S. Pat. No. 6,259,023

Inventor: Kenneth H. Reiker

Issued: Jul. 10, 2001

An electrical outlet box includes channels in a female member for receiving in spaced apart relationship three conductors of an uncut electrical cable. One or more sets of three receivers mounted in a male member for electrically engaging each conductor interconnects the conductors of the cable and defines an electrical socket of a socket assembly of the electrical outlet box. A cover is attachable to the male member for covering the space between the socket assembly and the surrounding wall board aperture. Fittings are included and formed as part of the electrical outlet box to permit back to back attachment of a pair of electrical outlet boxes and for side by side mounting in a ganged manner of two or more electrical outlet boxes. Routing of the cable in slots in the studs of a wall is described along with a retainer for retaining the cable in the slots.

U.S. Pat. No. 6,361,333

Inventor: Ronald G. Cash, Jr.

Issued: Mar. 26, 2002

The present invention provides an improved electrical junction box wherein the electrical wires from a building's electrical system are terminated by connection to a set of terminal strips and lugs in a secure area of the junction box housing rather than directly on an electrical receptacle device that is mounted on and connected to the junction box housing. In accordance with the instant invention, an improved electrical junction box provides at least one set of plug-and-play electrical terminals into which electrical receptacle devices plug directly, without any need for additional hard wiring, stripping, pig tailing, or the like. In a preferred embodiment of the instant invention, all electrical wires terminate in a secure, non-confined area of the junction box, thereby reducing the hazard of electrical shock as well as the risk of electrical fire.

W.I.P.O. Patent Number WO 96/05633

Inventor: Jonathan Jones

Issued: Feb. 22, 1996

An interlockable socket outlet having a housing assembly in which is mounted an electrical isolator, an isolator knob, which can be either a partly rotatable or a push knob, actuating the isolator; a socket of a plurality of differently sized and/or oriented sockets is removably mounted to the housing assembly, and each socket having a plug tab receiving slot and each slot coinciding with a single position relative to a mounting aperture of the socket. The outlet provides a flexible arrangement so that the socket of a range of different sizes can be fitted and/or reoriented whilst providing an adaptable interlock arrangement.

U.K. Patent Number GB2312340

Inventor: Andonis Polycarpou

Issued: Oct. 22, 1997

A junction box comprising a generally inverted cup-shaped body and one or more channels protruding from the upper end of the body. Each channel consists of a generally tubular portion, the lower half of which extends from the side wall of the body. The upper half of the channels protrudes above the upper surface of the closed end of the body, and comprises a curved inner end. The inner surface of the curved end of the channel forms a recess within the body, the recess curving towards the open end of the body. The recesses formed by the shape of the channels ensure that, when a wire or cable enters the junction box, it is guided towards the open end.

While these devices may be suitable for the purposes for which they were designed, they would not be as suitable for the purposes of the present invention, as hereinafter described.

SUMMARY OF THE PRESENT INVENTION

The present invention discloses a method and apparatus for wiring installations that will speed up the wiring process and provide a functionality that is not currently available. The method is comprised of designating locations for outlet boxes and wiring to an incorporated terminal block that has connection means for installing either receptacles or switches at a later time by anyone without the need of electrical expertise. The receptacles and switches have corresponding mating connection means related to the previously wired outlet box termination blocks. The simplified wiring method allows for the replacement of switches and receptacles with any other style of switch or receptacle having the mating connection members.

A primary object of the present invention is to provide a simplified method and apparatus for wiring a structure.

Another object of the present invention is to provide an outlet box having a termination block therein.

Yet another object of the present invention is to provide a termination block having means for connecting a hot, neutral and ground wire thereto.

Still yet another object of the present invention is to provide a termination block having means for connecting a ground wire with a plurality of hot and neutral wires thereto.

Another object of the present invention is to provide a termination block having receiving means for attaching receptacles and/or switches thereto.

Yet another object of the present invention is to provide a receptacle having connection means mating to the termination block receiving means whereby the receptacle becomes electrically engaged with said termination block.

Still yet another object of the present invention is to provide a switch having connection means mating to the termination block receiving means whereby the switch becomes electrically engaged with said termination block.

Another object of the present invention is to provide said receptacle and switch with locking means whereby said receptacle and/or switch lockingly engages the outlet box.

Yet another object of the present invention is to provide electrical fixtures with termination block engagement means therefore eliminating the need for a receptacle.

Additional objects of the present invention will appear as the description proceeds.

The present invention overcomes the shortcomings of the prior art by providing a method and apparatus for wiring installations that will speed up the wiring process and provide a functionality that is not currently available. The method is comprised of designating locations for outlet boxes and wiring to an incorporated terminal block that has connection means for installing either receptacles or switches at a latter time by anyone without the need of tools. The receptacles and switches have corresponding mating connection means related to the previously wired outlet box termination blocks. The simplified wiring method allows for the replacement of switches and receptacles to any other style of switch or receptacle having the mating connection members.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

LIST OF REFERENCE NUMERALS

Figure 1:
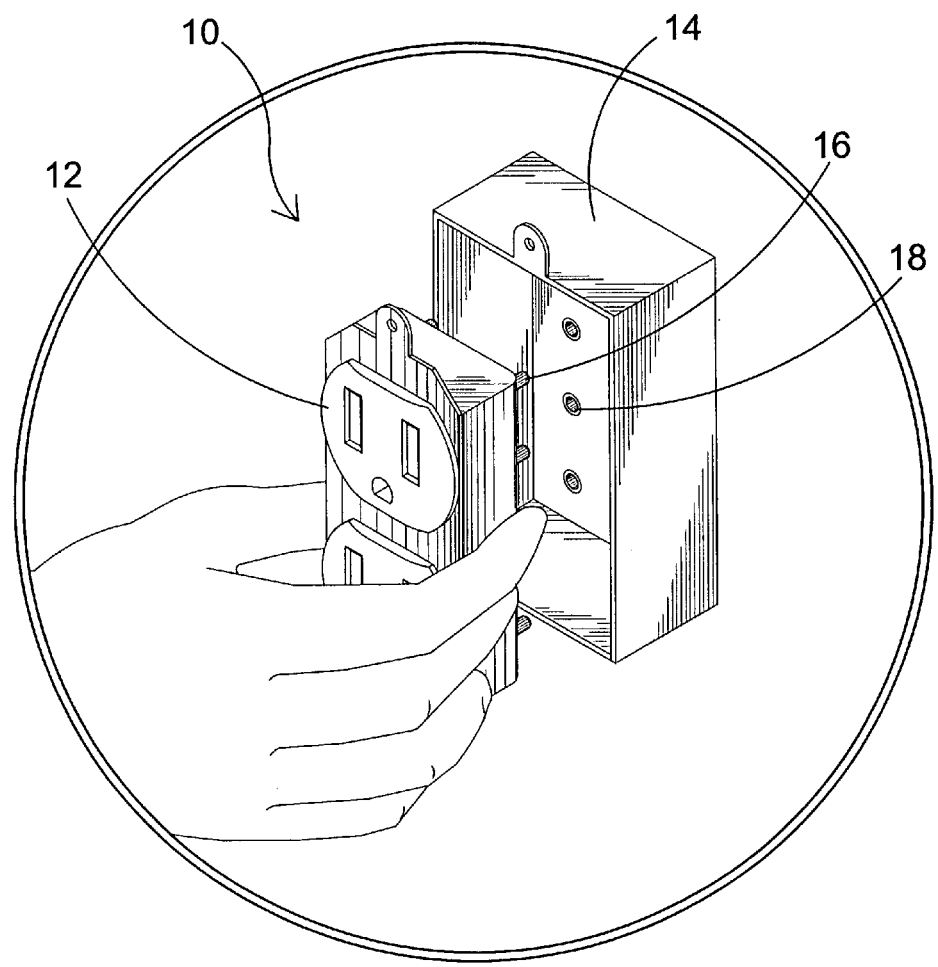
FIG. 1 is an illustrative view of the present invention.

With regard to reference numerals used, the following numbering is used throughout the drawings.

10 present invention
12 outlet
14 housing
16 male prongs/pin terminal
18 female connector/aperture
20 incoming power wires
22 non-conductive material
24 clamping mechanism
26 wiring
28 incoming wire terminal
30 incoming/outgoing terminals
32 set screw
34 fastener aperture
36 switch
38 flip switch
40 electrical fixture

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10. The electrical system of the present invention 10 provides means for quick connect functionality of electrical outlets 12, switches and fixtures. The electrical system comprises a typical, wall mounted box or housing 14, a pre-wired terminal connector, and an electrical outlet 12, switch, or fixture that contains conductive prongs 16 that mate with the pre-wired terminal connector or aperture 18. The system allows for quick and easy installation and removal of the electrical components.

Figure 2:
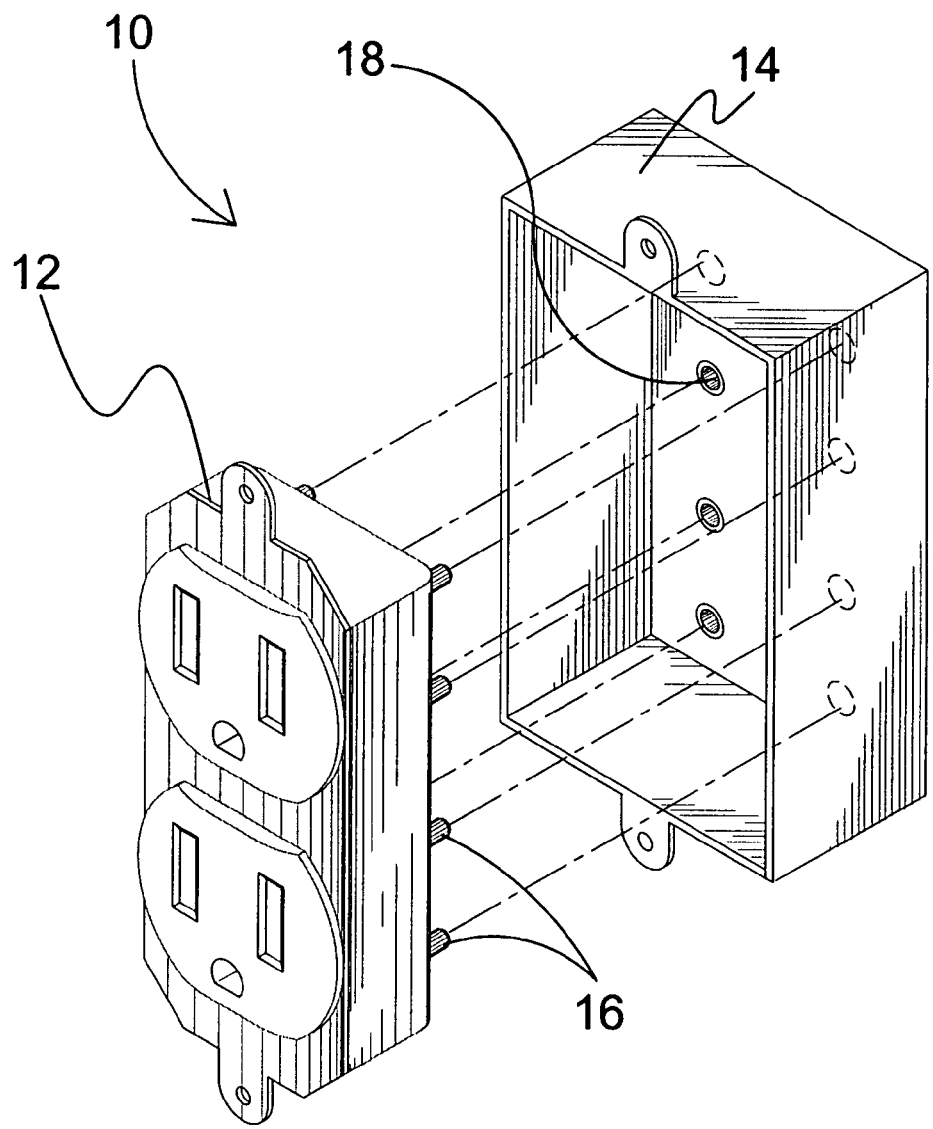
FIG. 2 is an isometric view of the present invention.

Turning to FIG. 2, shown therein is an isometric view of the present invention 10. Depicted in FIG. 2 is the electrical system with a duplex outlet 12 detached from the pre-wired terminal connector 18. The backside of duplex outlet 12 contains a series of pin style terminals 16 that mate with coinciding female pin connectors 18 housed within an electrical box 14. The duplex outlet 12 may be quickly and easily attached without the use of tools.

Figure 3:
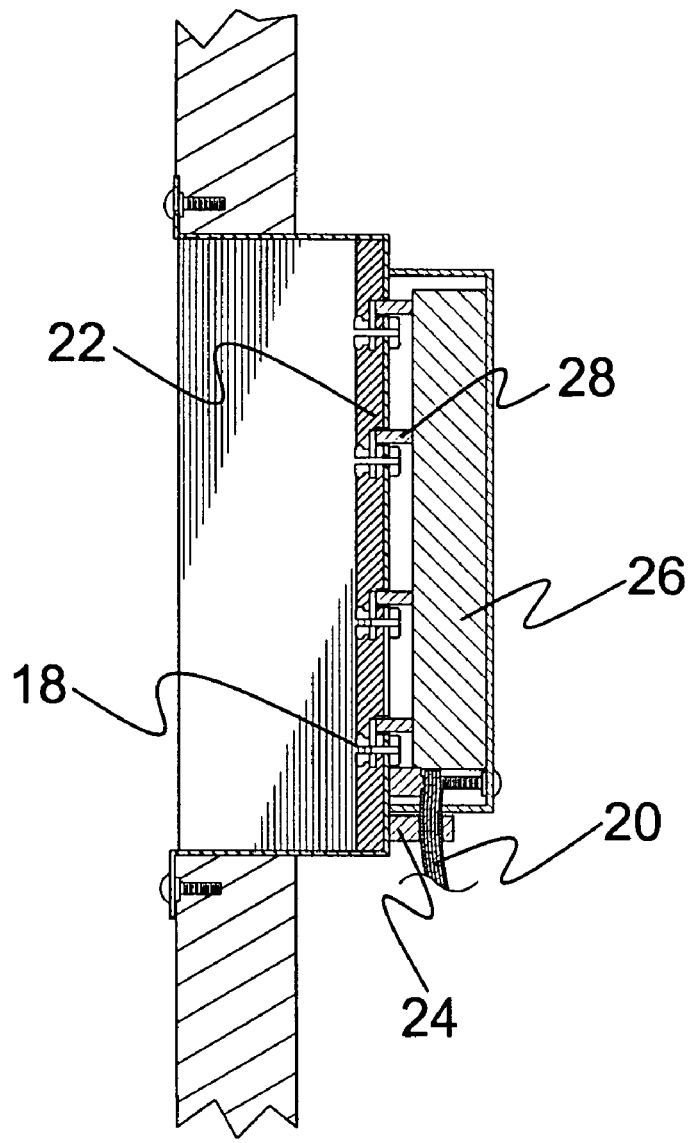
FIG. 3 is a side sectional view of the present invention's terminal connector and housing.

Turning to FIG. 3, shown therein is a side sectional view of the present invention's terminal connector and housing. Depicted is the terminal connector electrically connected to incoming power wires 20. Screw terminals fixedly attached to the female pin connectors 18 provide means to connect incoming power. A non-conductive material 22 is affixed between the terminals to create a barrier and prevent electrical short circuits between the positive, neutral, and ground connections. Functions of the female terminals 18 are determined by the pre-wired structures in the box while the functionality of pre-wired structures in the box are determined by how they are wired to existing circuitry. Also shown are the clamping mechanism 24, wiring 26 and incoming wire terminal 28.

Figure 4:
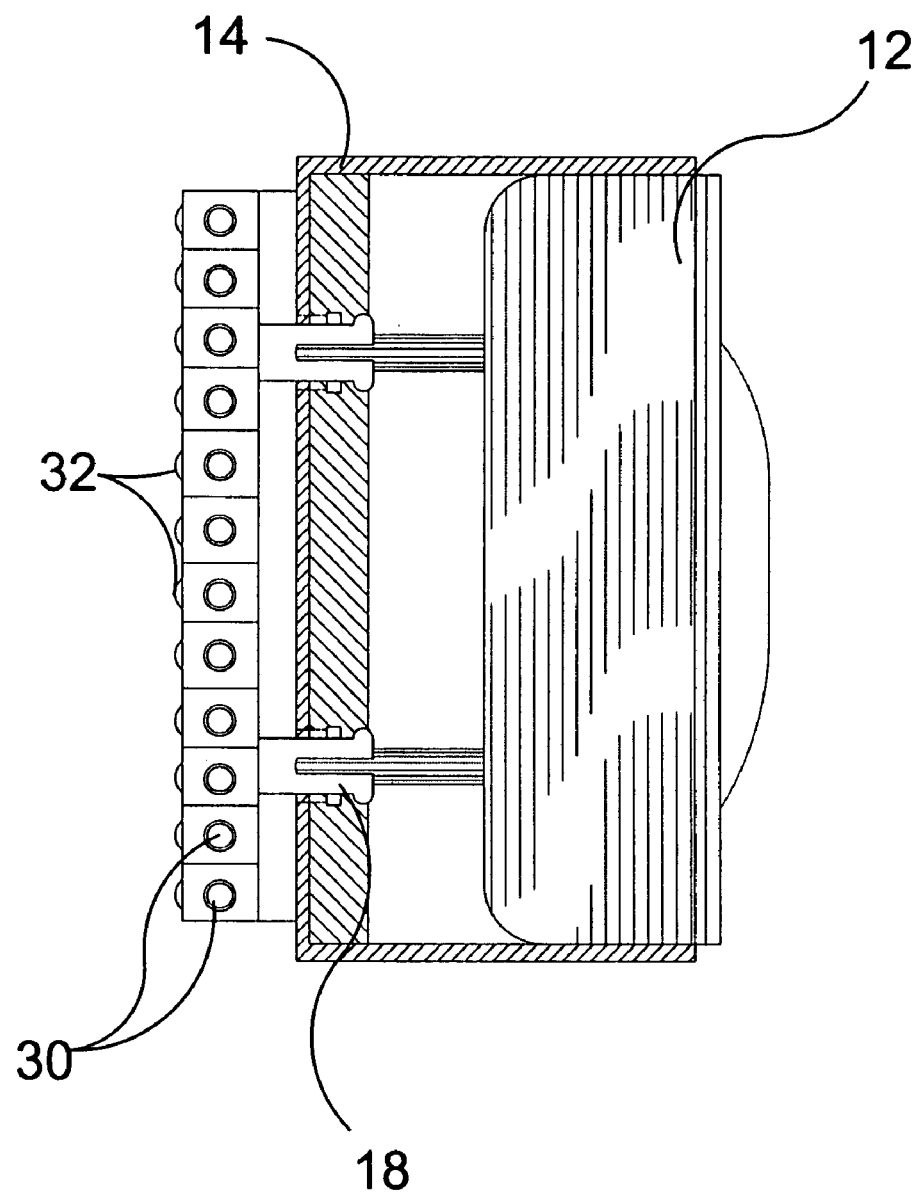
FIG. 4 is a top sectional view of the present invention's terminal connector and switch assembly.

Turning to FIG. 4, shown therein is a top sectional view of the present invention's terminal connector and switch assembly. Depicted is a duplex outlet 12 secured within the terminal connector 18. When the quick connect duplex 12 is secured, the mating pin terminals are interconnected providing power to the outlet. Additionally shown are a series of incoming and outgoing terminals 30 with set screws 32 for the affixing of incoming and outgoing wiring to the pre-wired structures. Box 14 is also shown.

Figure 5:
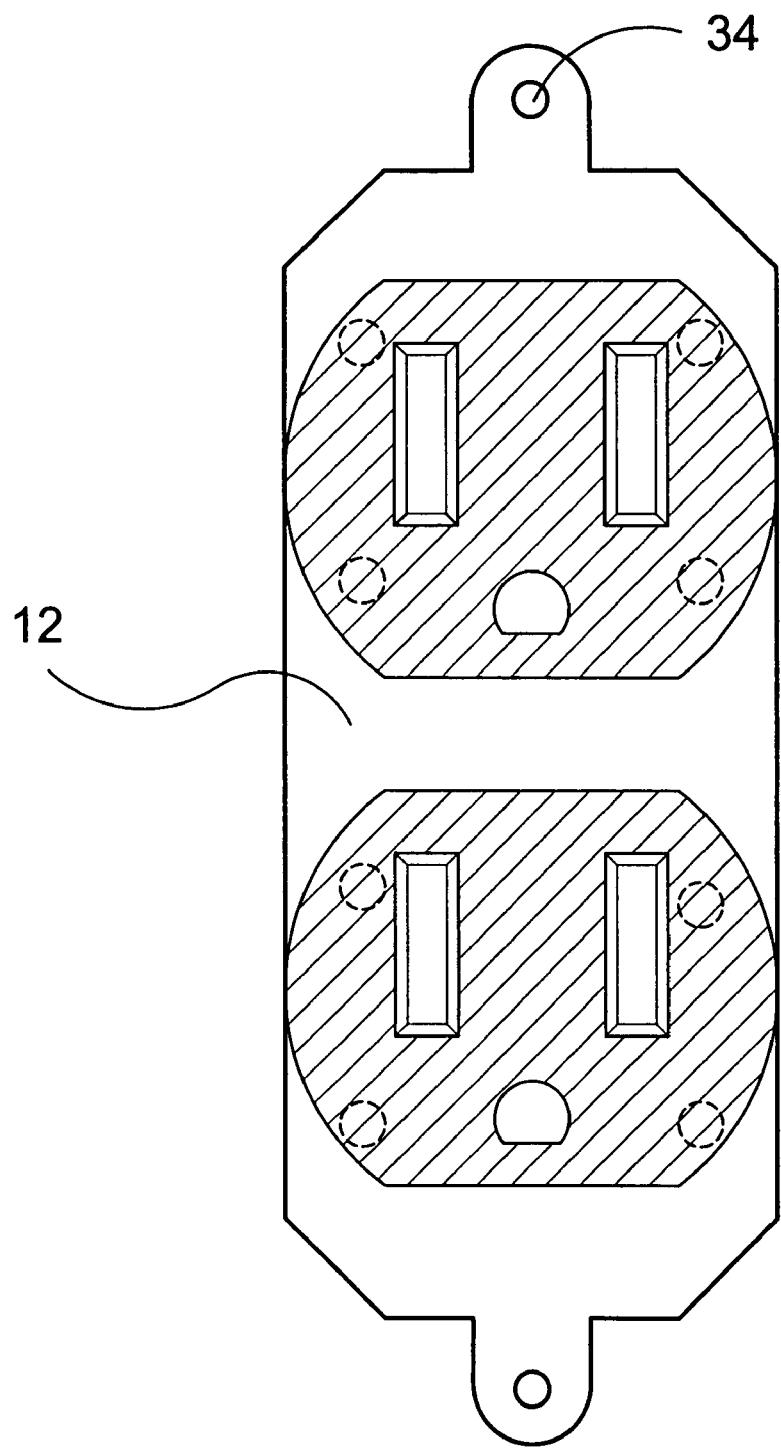
FIG. 5 is a front view of the present invention's duplex outlet.

Turning to FIG. 5, shown therein is a front view of the present invention's duplex outlet 12. The duplex outlet 12 of the present invention is preconfigured to provide power to plugs of various appliances, tools, and other electrical devices. The pin terminals affixed to the backside of the outlet 12 are internally wired to the mating power and ground terminals. The present invention is secured to the terminal connectors by means of a fastener aperture 34 whereby typically a quarter-turn fastener may be used to secure a connection.

Figure 6:
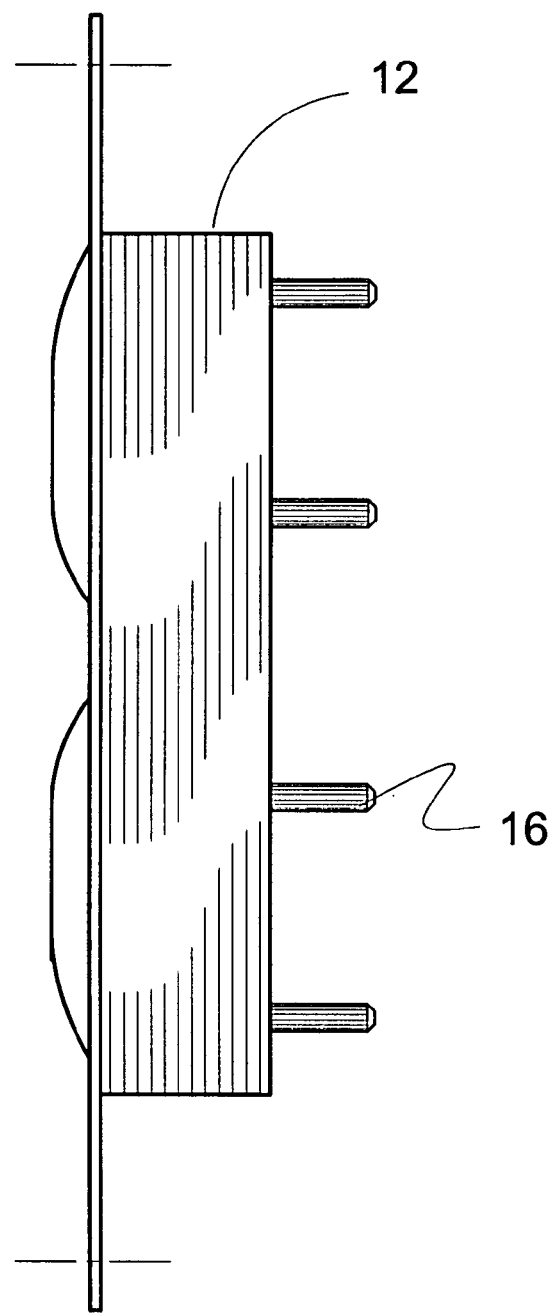
FIG. 6 is a side view of the present invention's duplex outlet.

Turning to FIG. 6, shown therein is a side view of the present invention's duplex outlet 12. The duplex outlet 12 of the present invention is configured with pin style terminals 16 that mate with coinciding female pin connectors housed within a pre-wired electrical box. The duplex outlet 12 may be quickly and easily attached without the use of specialized tools.

Figure 7:
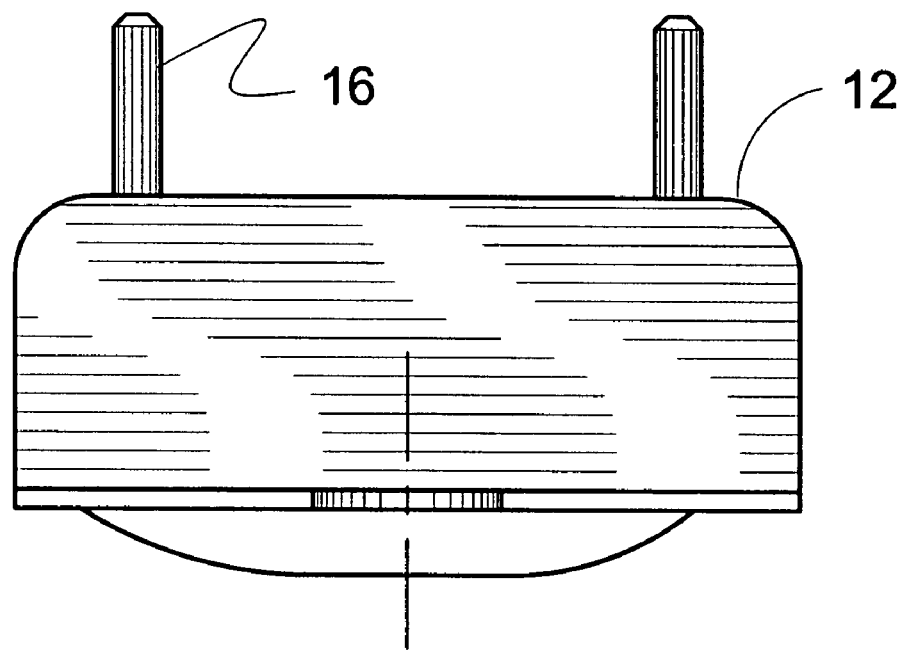
FIG. 7 is a top view of the present invention's duplex outlet.

Turning to FIG. 7, shown therein is a top view of the present invention's duplex outlet 12. The duplex outlet 12 of the present invention is outfitted with a series of male pin terminals 16 that coincide with female terminals to enact with on another to form an electrical connection.

Figure 8:
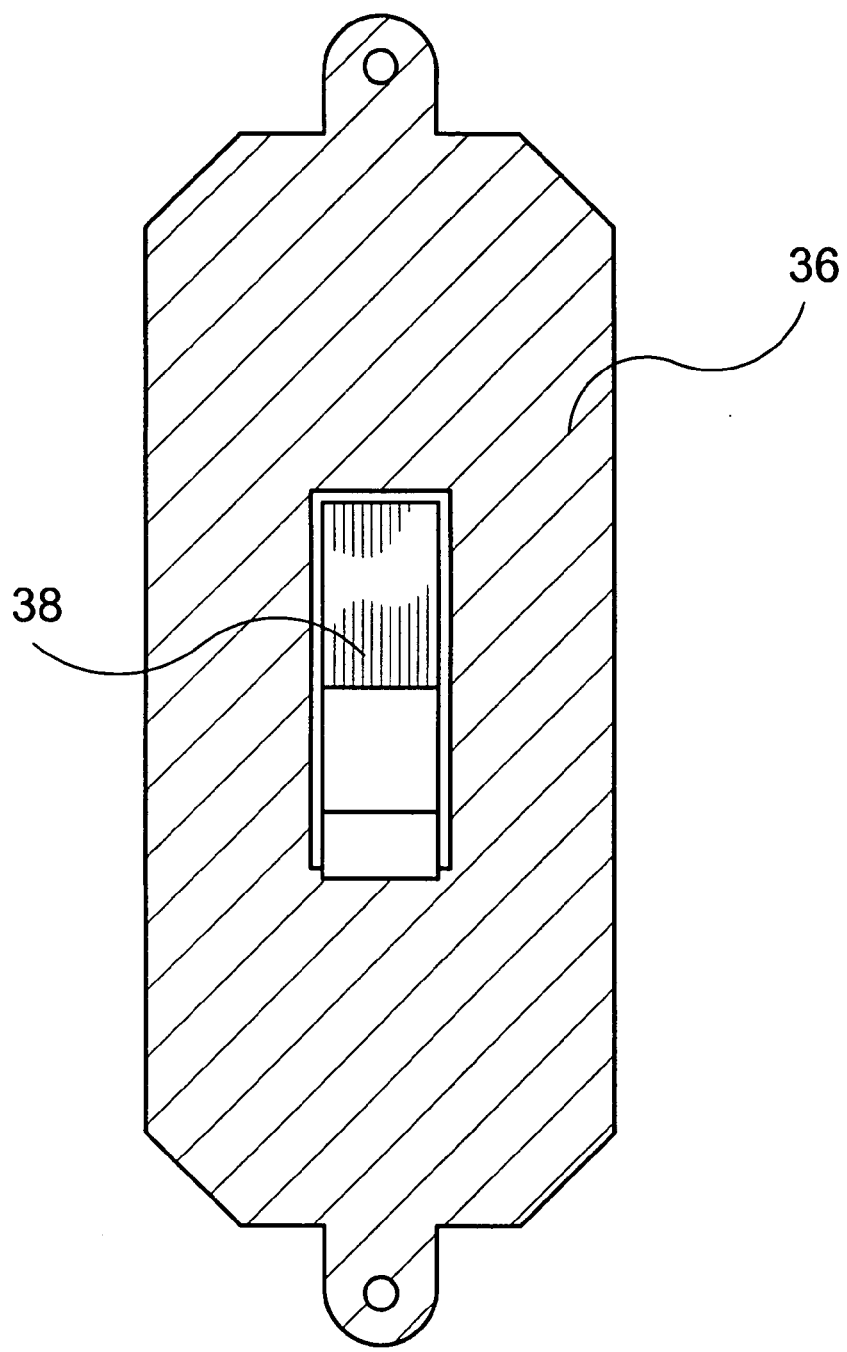
FIG. 8 is a front view of the present invention's switch.

Turning to FIG. 8, shown therein is a front view of the present invention's switch 36. The power switch 36 of the present invention is preconfigured to enable or disable power to various appliances, tools, and other electrical devices. The pin terminals affixed to the backside of the switch 36 are internally wired to the mating power and ground terminals. The on/off or flip switch 38 is also shown.

Figure 9:
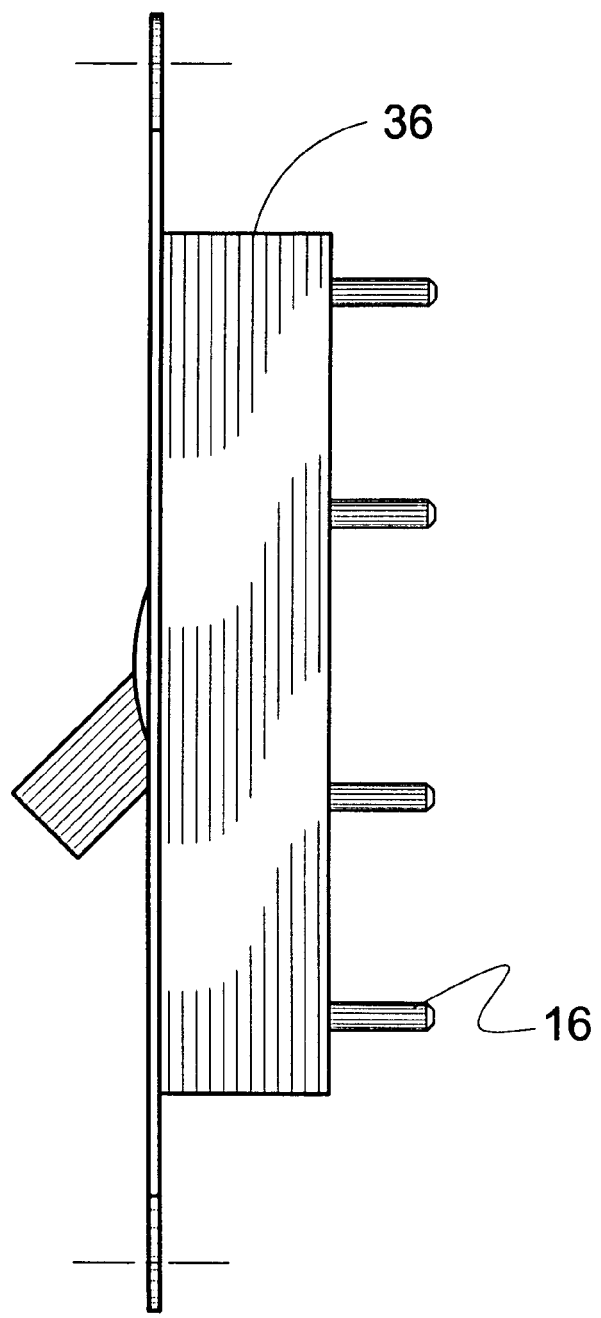
FIG. 9 is a side view of the present invention's switch.

Turning to FIG. 9, shown therein is a side view of the present invention's switch 36. The power switch 36 of the present invention is configured with pin style terminals 16 that mate with coinciding female pin connectors housed within a pre-wired electrical box. The power switch 36 may be quickly and easily attached without the use of tools.

Figure 10:
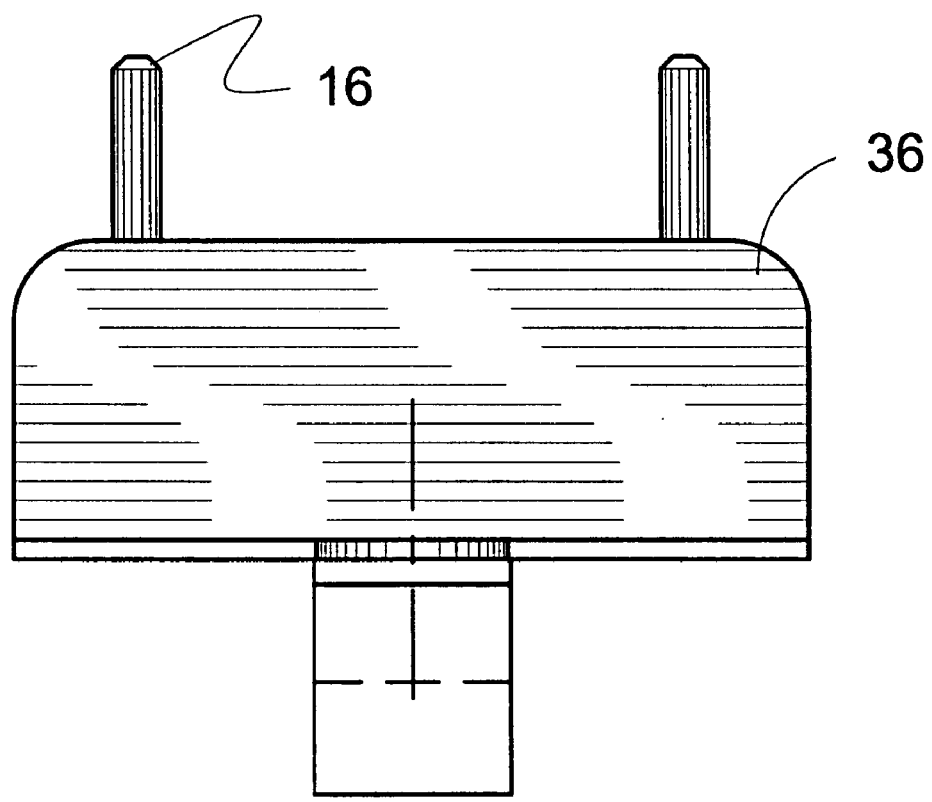
FIG. 10 is a top view of the present invention's power switch.

Turning to FIG. 10, shown therein is a top view of the present invention's power switch 36. The power switch 36 of the present invention is configured to be secured to the terminal connectors by means of a fastener aperture whereby typically a quarter-turn fastener may be used to secure a connection thereto. This allows the power switch 36 to be quickly and easily attached or removed without the use of tools. Pin terminal 16 is also shown.

Figure 11:
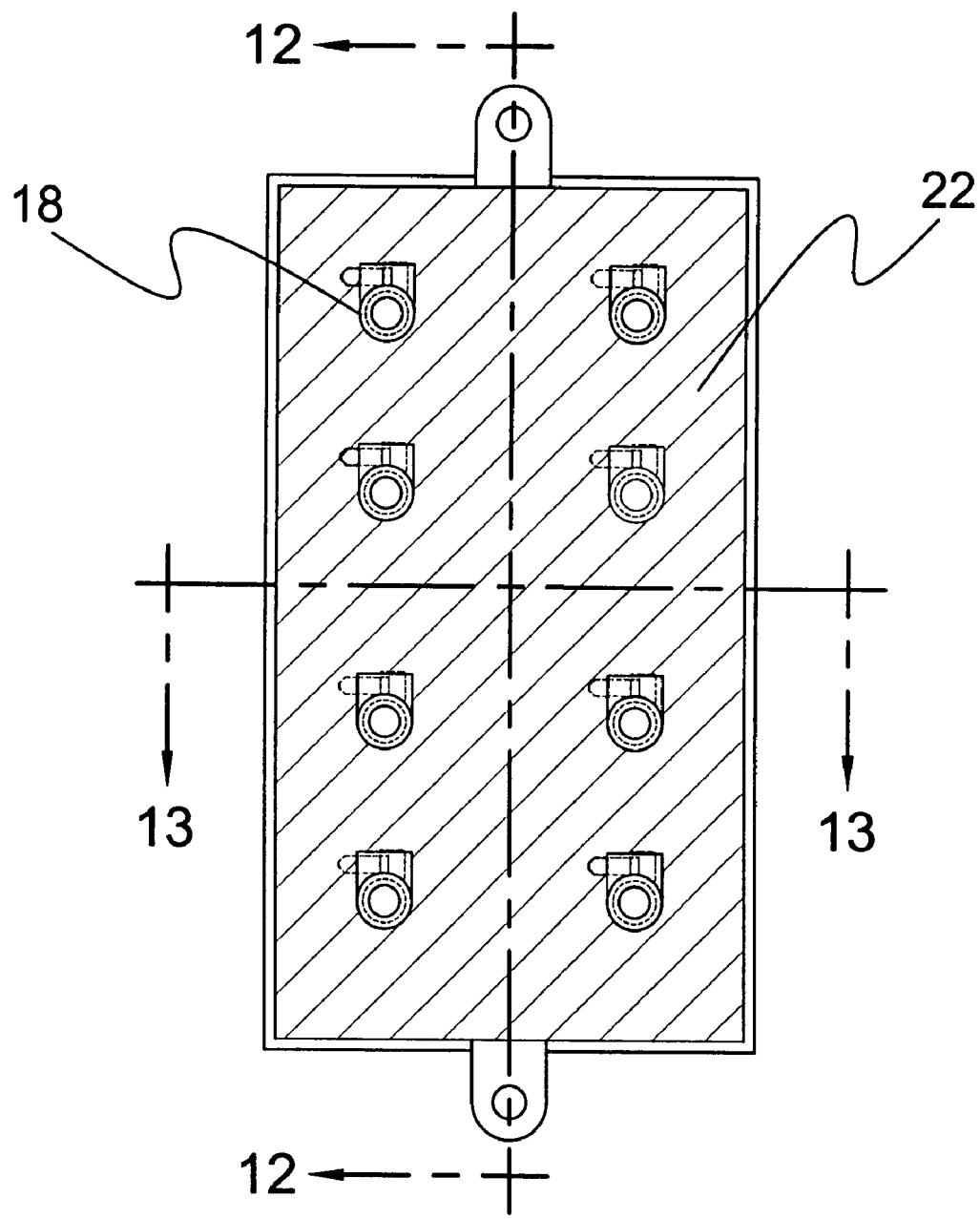
FIG. 11 is a front view of the present invention's terminal connector.

Turning to FIG. 11, shown therein is a front view of the present invention's terminal connector. The terminal connector of the present invention provides means for quick and easy installation and removal of electrical outlets, switches and fixtures. Screw terminals fixedly attached to the junction box provide means to connect incoming power. A non-conductive material 22 is affixed between the female terminals 18 to create a barrier and prevent electrical short circuits between the positive, neutral, and ground connections. Additionally, the female pin connectors 18 are electrically pre-wired to screw terminals on the junction box.

Figure 12:
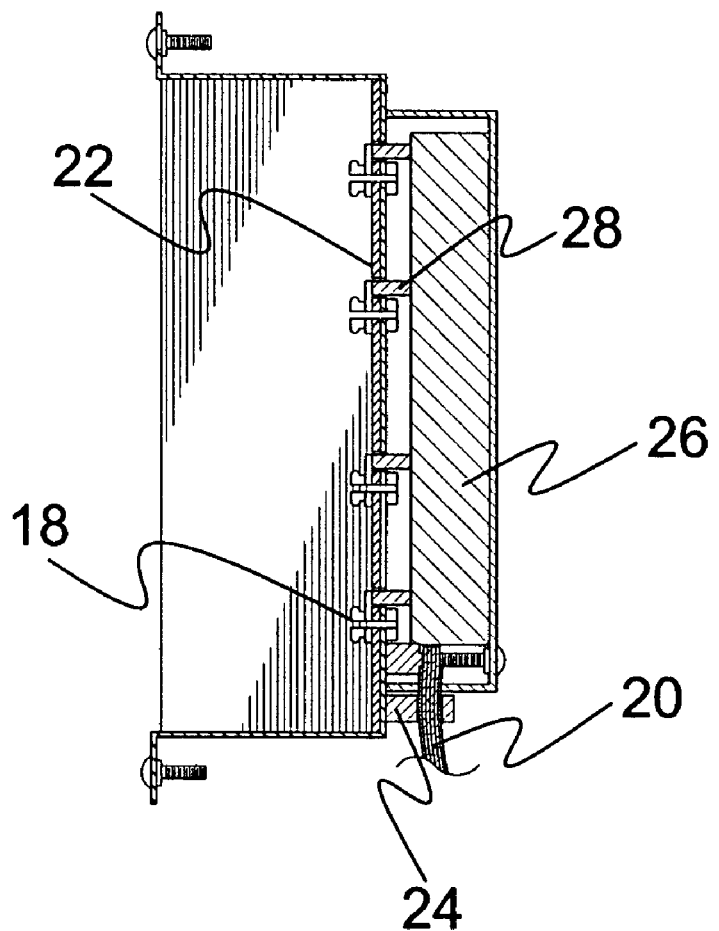
FIG. 12 is a sectional view of the present invention's terminal connector.

Turning to FIG. 12, shown therein is a sectional view of the present invention's terminal connector. The terminal connector of the present invention provides means for quick and easy installation and removal of electrical outlets, switches and fixtures. Pre-wiring fixedly attached to the female pin connectors 18 provide means to connect incoming power. Also shown are the non-conductive barrier 22, incoming wire terminal 28, wiring 26, incoming power wiring 20, and clamping mechanism 24.

Figure 13:
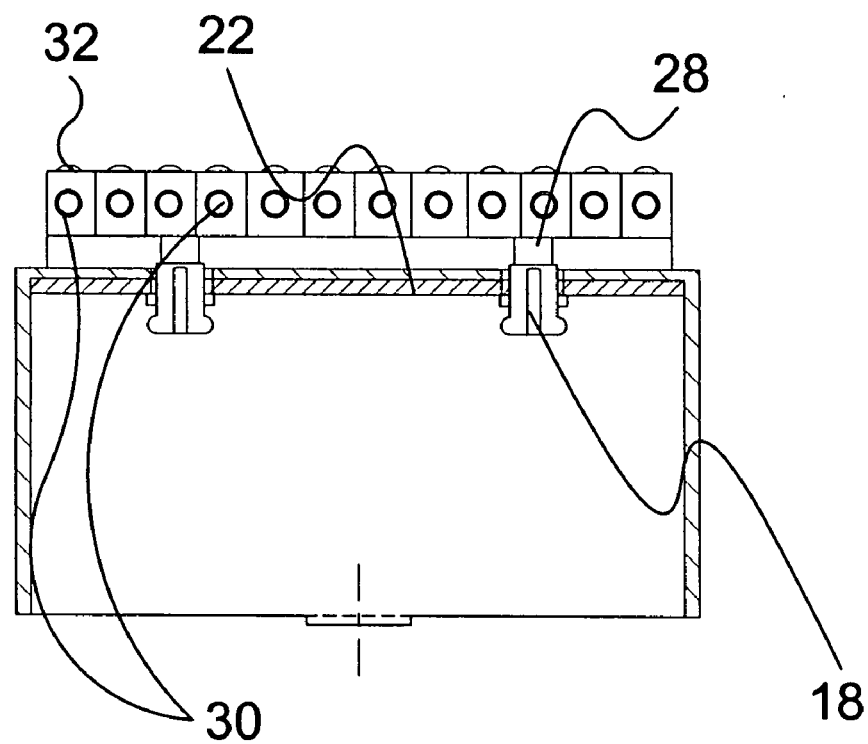
FIG. 13 is a sectional view of the present invention's terminal connector.

Turning to FIG. 13, shown therein is a sectional view of the present invention's terminal connector. The terminal connector of the present invention provides means for quick and easy installation and removal of electrical outlets, switches and fixtures. Pre-wiring fixedly attached to the female pin connectors 18 provide means to connect incoming power. A non-conductive material 22 is affixed between the terminals to create a barrier and prevent electrical short circuits between the positive, neutral, and ground connections. Also shown are set screw 32, incoming wire terminal 28, and incoming/outgoing terminals 30.

Figure 14:
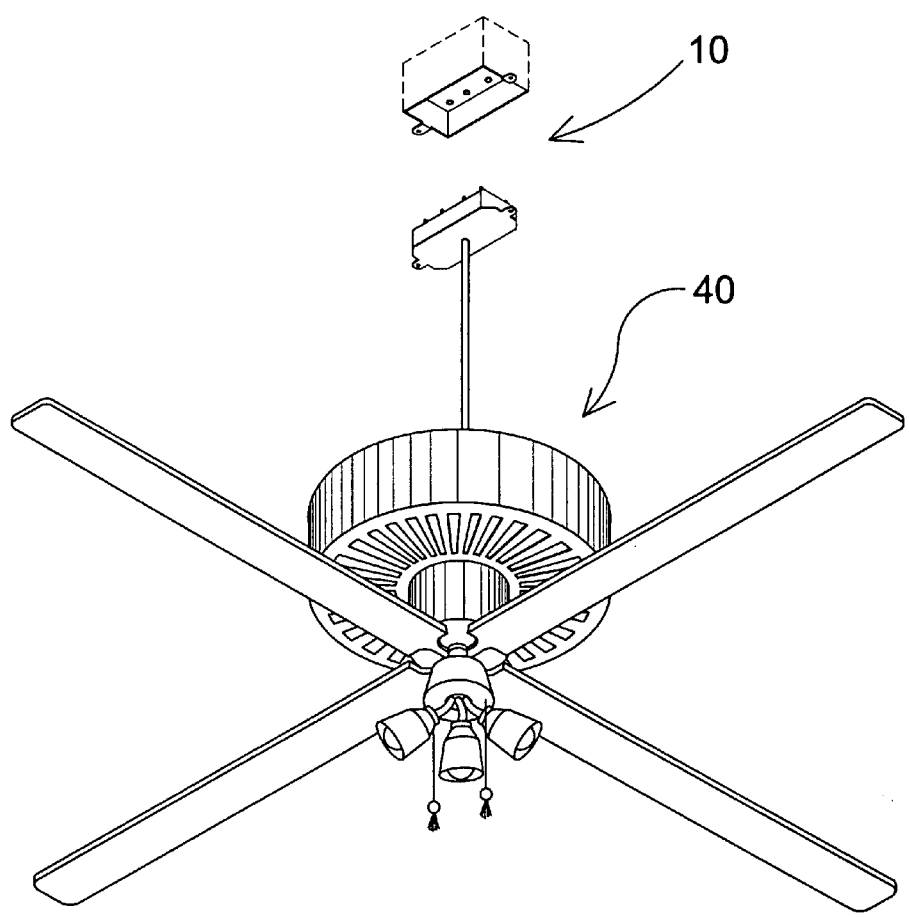
FIG. 14 is an illustrative view of the present invention in use with an electrical fixture.

Turning to FIG. 14, shown therein is an illustrative view of the present invention 10 in use with an electrical fixture 40. The electrical system of the present invention provides means for quick and easy installation and removal of various electrical fixtures. The fixture 40 can be either manufactured with coinciding pin style connectors, or retrofitted with pin terminals to suit the electrical system of the present invention.

What is claimed is:

1. An apparatus for a quick connect electrical socket for use as part of a building electrical system and adapted for use with an electrical outlet, a power switch, or a fixture directly connected to an electrical appliance, comprising:
   a) an electrical box, said box being mounted on a wall of the building, said box being electrically connected to the electrical system of the building, said box having a back wall having front and rear surfaces, four side walls and a forwardly facing opening;

b) a plurality of female electrical connectors made up of apertures being disposed on said front surface of said back wall of said box;

c) a plurality of incoming and outgoing terminals with set screws for the affixing of incoming and outgoing wiring mounted on the rear surface of said back wall, said female electrical connectors being pre-wired to said incoming and outgoing terminals, so that said quick connect electrical socket is a unitary assembly;

d) an electrical fixture being disposed in said electrical box through said forwardly facing opening, said electrical fixture having a front and rear side, said electrical fixture being one of either an electric outlet, a power switch, or a fixture directly connected to an electrical appliance; and, e) a plurality of male electrical connectors being disposed on said rear side of said electrical fixture, wherein said male electrical connectors mate with said female electrical connectors so that said electrical fixture is electrically connected to the electrical system of the building.

2. The apparatus of claim 1, wherein said electrical appliance is an electric fan.

3. A method for providing a universal quick connect electrical socket for use as part of a building electrical system for use with an electrical outlet, a power switch, or a fixture directly connected to an electrical appliance, comprising the steps of:

a) mounting a plurality of electrical boxes on the walls of the building, the boxes being electrically connected to the electrical system of the building, the boxes having a back wall having front and rear surfaces, four side walls and a forwardly facing opening;

b) providing a plurality of female electrical connectors made up of apertures in the front surface of the back wall of the boxes;

c) providing a plurality of incoming and outgoing terminals with set screws for the affixing of incoming and outgoing wiring mounted on the rear surface of said back wall, said female electrical connectors being pre-wired to said incoming and outgoing terminals so that said quick connect electrical socket is a unitary assembly;

d) providing a plurality of electrical fixtures for being mounted in the electrical boxes, the electrical fixtures having a front and rear side, said electrical fixture being one of either an electric outlet, a power switch, or a fixture directly connected to an electric appliance; and, e) providing a plurality of male electrical connectors on the rear side of the electrical fixture, wherein the male electrical connectors mate with the female electrical connectors so that the electrical fixture is electrically connected to the electrical system of the building.

4. The method of claim 3, in which said electric appliance is a fan.

* * * * *